(12) United States Patent
Barnes et al.

(10) Patent No.: US 9,749,565 B2
(45) Date of Patent: Aug. 29, 2017

(54) INTERLINE CHARGE-COUPLED DEVICES

(71) Applicant: ANALOG DEVICES, INC., Norwood, MA (US)

(72) Inventors: Erik D. Barnes, Cambridge (GB); Jonathan Goldberg, Lexington, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 15/012,912

(22) Filed: Feb. 2, 2016

(65) Prior Publication Data

US 2016/0344967 A1    Nov. 24, 2016

Related U.S. Application Data

(60) Provisional application No. 62/163,139, filed on May 18, 2015.

(51) Int. Cl.
*H04N 5/372*       (2011.01)
*H04N 5/3728*     (2011.01)
(Continued)

(52) U.S. Cl.
CPC ......... *H04N 5/3728* (2013.01); *G01S 7/4863* (2013.01); *G01S 17/10* (2013.01);
(Continued)

(58) Field of Classification Search
CPC ...................................................... H04N 5/372
(Continued)

(56) References Cited

U.S. PATENT DOCUMENTS 3,940,602 A * 2/1976 Lagnado .......... H01L 27/14825
                                                            257/229
4,916,543 A    4/1990 Crosby
(Continued)

OTHER PUBLICATIONS

International Search Report and Written Opinion issued in International Patent Application Serial No. PCT/US2016/031560 dated Aug. 24, 2016, 8 pages.
(Continued)

*Primary Examiner* — Anthony J Daniels
(74) *Attorney, Agent, or Firm* — Patent Capital Group

(57) ABSTRACT

Image capturing systems with interline CCD structures designed to reduce the delay between captures of subsequent image frames are disclosed. Proposed interline CCD structures include two or more sets of storage units associated with a given set of photodetecting elements, where each photodetecting element is associated with one storage unit of each set of storage units in that the charge generated by the photodetecting element during the acquisition of a particular image frame (i.e. during a particular exposure period) may be stored any one of these storage units prior to read-out. Providing multiple sets of storage units allows read-out of charge corresponding to one image frame and stored in one set of storage units while accumulating charge corresponding to another image frame in another set of storage units, thus reducing the delay between captures of different image frames. Consequently, errors and artifacts of the image capturing system can be minimized.

18 Claims, 13 Drawing Sheets

(51) Int. Cl.
*G01S 17/89* (2006.01)
*G01S 17/10* (2006.01)
*G01S 17/36* (2006.01)
*G01S 7/486* (2006.01)

(52) U.S. Cl.
CPC .............. *G01S 17/36* (2013.01); *G01S 17/89* (2013.01); *H04N 5/37213* (2013.01)

(58) Field of Classification Search
USPC ........................................................ 348/311
See application file for complete search history.

(56) References Cited

U.S. PATENT DOCUMENTS

| | | | | |
|---|---|---|---|---|
| 5,043,818 | A * | 8/1991 | Yokoyama | H04N 5/353 348/297 |
| 5,060,245 | A | 10/1991 | Nelson | |
| 5,355,165 | A | 10/1994 | Kosonocky et al. | |
| 5,459,509 | A * | 10/1995 | Monoi | H04N 5/37213 348/248 |
| 5,585,621 | A * | 12/1996 | Hayakawa | H04N 5/37213 250/208.1 |
| 7,023,481 | B1 * | 4/2006 | Watanabe | G06K 7/10841 257/E27.152 |
| 8,059,176 | B2 * | 11/2011 | Ikehata | H04N 3/1581 348/280 |
| 8,699,008 | B2 | 4/2014 | Murakami et al. | |
| 8,829,579 | B2 | 9/2014 | Masuda | |
| 2006/0082670 | A1 | 4/2006 | Parks | |
| 2009/0256060 | A1 | 10/2009 | Meynants et al. | |
| 2010/0085461 | A1 * | 4/2010 | Takatsuka | H04N 5/23241 348/316 |
| 2013/0015910 | A1 * | 1/2013 | Tubert | H04N 5/372 327/534 |
| 2016/0103223 | A1 * | 4/2016 | Yarino | G01S 17/89 356/5.01 |

OTHER PUBLICATIONS

T. Goji Etoh et al., *A CCD Image Sensor of 1Mframes/s for Continuous Image Capturing of 103 Frames*, ISSCC 2002 / Session 2 / Image Sensors / 2.7, 2002 IEEE International Solid-State Circuits Conference, 0-7803-7335-9, © 2002 IEEE, 6 pages.

*Characteristics and Use of FFT-CCD Area Image Sensor*, Technical Information SD-25, Hamamatsu, Cat. No. KMPD9002E06, Sep. 2003 on, 27 pages.

*CCD Sensor Architectures, Architectures commonly used for high performance cameras*, ANDOR, an Oxford Instruments Company, downloaded from the Internet on Jan. 5, 2016, 1 page. http://www.andor.com/learning-academy/ccd-sensor-architectures-architectures-commonly-used-for-high-performance-cameras.

\* cited by examiner

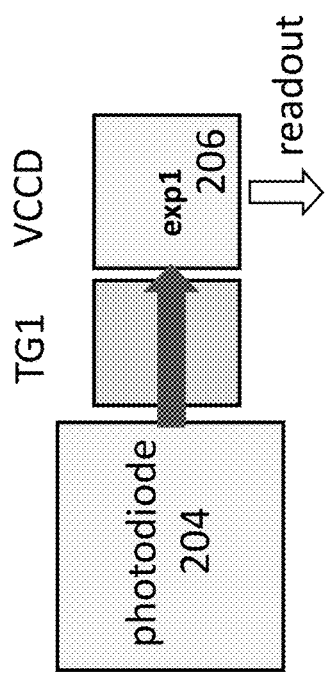
FIGURE 2B (TOP VIEW)
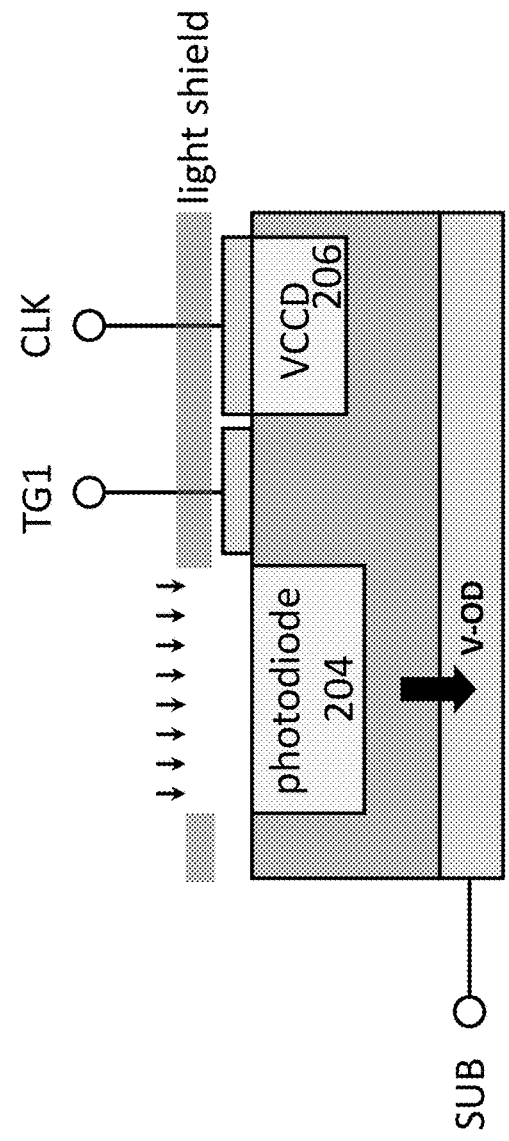
FIGURE 2C (CROSS SECTION)

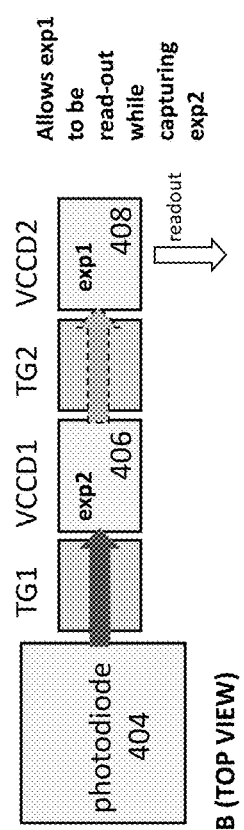
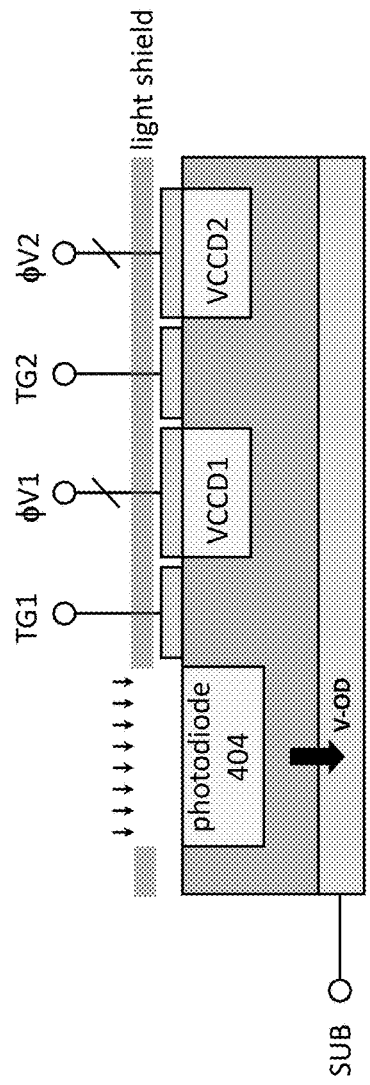
FIGURE 4B (TOP VIEW)
FIGURE 4C (CROSS SECTION)

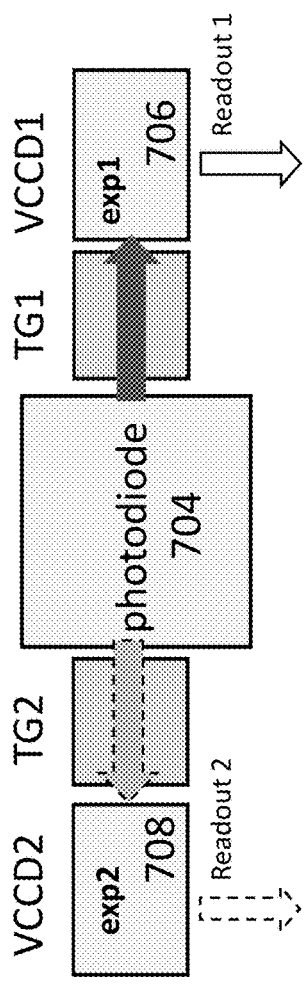
FIGURE 7B (TOP VIEW)
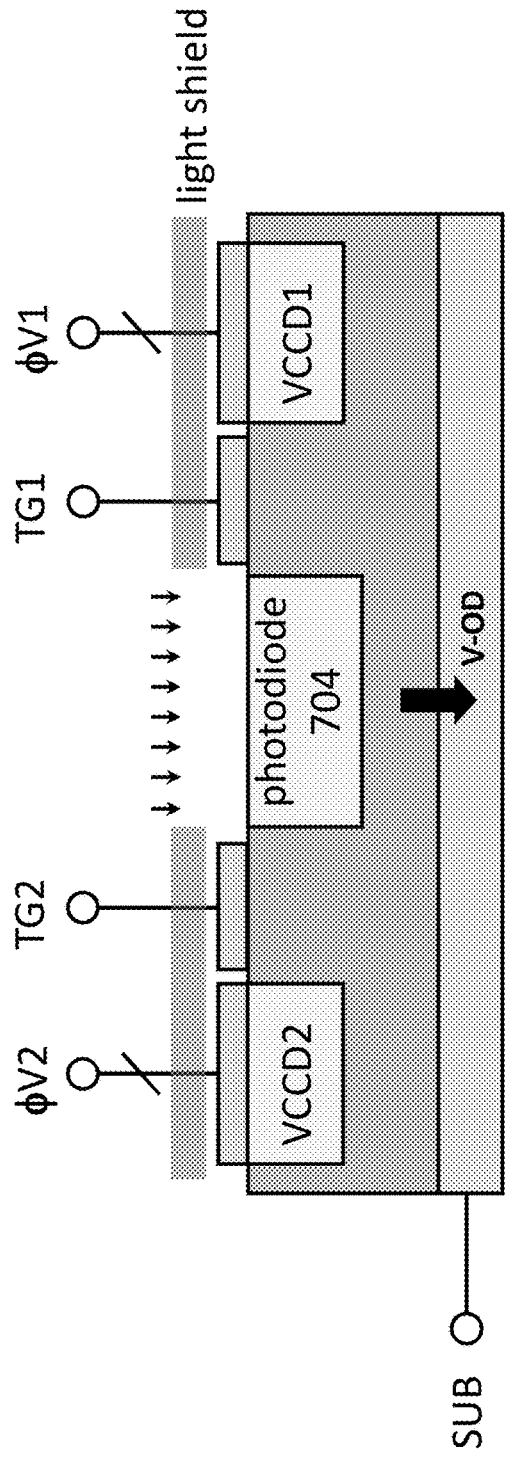
FIGURE 7C (CROSS SECTION)

INTERLINE CHARGE-COUPLED DEVICES

CROSS-REFERENCE TO RELATED APPLICATIONS

This application claims the benefit of and priority from U.S. Provisional Patent Application Ser. No. 62/163,139 filed 18 May 2015 entitled "DUAL VERTICAL CHARGED-COUPLED DEVICE," which is incorporated herein by reference in its entirety.

TECHNICAL FIELD OF THE DISCLOSURE

The present invention relates to the field of electronic devices, in particular to image acquisition systems comprising interline charge-coupled devices.

BACKGROUND

An image sensor is a sensor that detects and measures light incident thereon in order to convey the information that constitutes an image. To that end, an image sensor typically comprises a plurality of photodetecting, or photosensitive, elements such, as e.g. photodiodes, configured to convert light incident thereon into electrical charge. An image sensor may be viewed as a grid, or an array, of imaging pixels, each imaging pixel comprising a photodetecting element, typically individually addressable and individually controllable, for measuring light incident thereon.

A charge-coupled device (CCD) is a device for the movement of electrical charge, e.g. from an area where the charge was generated to an area where the charge can be manipulated, e.g. converted into a digital value and possibly followed by further digital processing of the digital value. A CCD may be viewed as moving charge between capacitive bins (potential wells or charge reservoirs) in the device, with the shift allowing for the transfer of charge between bins.

A CCD image sensor is a particular class of image sensors capable of acquiring images, sometimes referred to as "image frames," in which a CCD is used to store and read out the charge accumulated by the photodetecting elements. As used in the art, "acquisition" of an image frame, referred to, interchangeably, as an "exposure", or an "acquisition of an exposure" or a "capture" of an image frame/exposure commonly refers to the collection of photo-generated electrons from the light of a target scene by individual photodetection elements or pixels for a specific period of time ("exposure time" or "period" or "acquisition time" or "period"). As also used in the art, "read-out" of an image frame or an exposure commonly refers to the transport of the collected charge from the storage elements to additional circuits which convert the charge to voltage or current for subsequent digitization of the pixel information.

CCD image sensors are often incorporated into image acquisition systems employed in various settings. Performance of such image acquisition systems is influenced by the image acquisition and read-out capabilities and characteristics of the CCD sensors included therein. Further improvements with respect to acquisition and read-out of image frames in CCD image sensors are always desirable.

OVERVIEW

Embodiments of the present disclosure provide mechanisms to control acquisition and read-out of image frames in CCD image sensors. The mechanisms described herein are applicable to interline CCDs, and may be especially attractive for Time of Flight (TOF) applications or other applications that use multi-shutter image frames, while also being compatible with applications that use single-shutter image frames.

One aspect of the present disclose provides an image acquisition system comprising an interline CCD sensor and a controller for controlling image acquisition and read-out functionality of the interline CCD sensor. The interline CCD sensor includes a plurality of photodetecting elements, a plurality of first storage units and a plurality of second storage units. The first storage units are configured for storing, prior to the read-out of the CCD image sensor, a first charge generated by the plurality of photodetecting elements during an acquisition of a first image frame during a first exposure period (i.e. a charge representing at least a part of an image frame that is acquired during the first exposure period). The plurality of second storage units are configured for storing, prior to read-out (i.e. to be read out), a second charge generated by the plurality of photodetecting elements during an acquisition of a second image frame during a second exposure period (i.e. a charge representing at least a part of an image frame that is acquired during the second exposure period, which image frame is different from the image frame that is acquired during the first exposure period). The controller is configured to control acquisition and read-out operations of the interline CCD sensor to ensure that at least a part of the first charge is read out during the acquisition of the second image frame. In other words, the controller ensures that some storage units of the interline CCD sensor, namely the storage units storing charge generated during the first exposure period of the photodetecting elements, are read out, at least partially at the same time, but preferably simultaneously with, the photodetecting elements accumulating charge in the second exposure period. The controller further ensures that the charge accumulated during the second exposure period is stored in some other storage units, namely in the storage units storing charge accumulated during the second exposure period of the photodetecting elements.

Because the controller described herein is used to control functionality of an interline CCD sensor, in the following, such a controller is referred to as an "interline CCD controller."

As will be appreciated by one skilled in the art, aspects of the present disclosure may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more processing units, e.g. one or more microprocessors, of one or more computers. In various embodiments, different steps and portions of the steps of each of the examples described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing interline CCD sensors or their controllers, etc.) or be stored upon manufacturing of these devices and systems.

Other features and advantages of the disclosure are apparent from the following description, and from the claims.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2B provides a top view of a photodetecting element and an associated storage unit used in the grid of the conventional interline CCD sensor shown in FIG. 2A;

FIG. 2C provides a cross section view of the photodetecting element and the associated storage unit shown in FIG. 2B;

FIG. 4B provides a top view of a photodetecting element and two associated storage units used in the grid of the interline CCD sensor shown in FIG. 4A, according to one embodiment of the disclosure;

FIG. 4C provides a cross section view of the photodetecting element and the two associated storage units shown in FIG. 4B, according to one embodiment of the disclosure;

FIG. 7B provides a top view of a photodetecting element and two associated storage units used in the grid of the interline CCD sensor shown in FIG. 7A, according to one embodiment of the disclosure;

FIG. 7C provides a cross section view of the photodetecting element and the two associated storage units shown in FIG. 7B, according to one embodiment of the disclosure;

DESCRIPTION OF EXAMPLE EMBODIMENTS OF THE DISCLOSURE

Understanding Time-of-Flight Cameras

Figure 1:
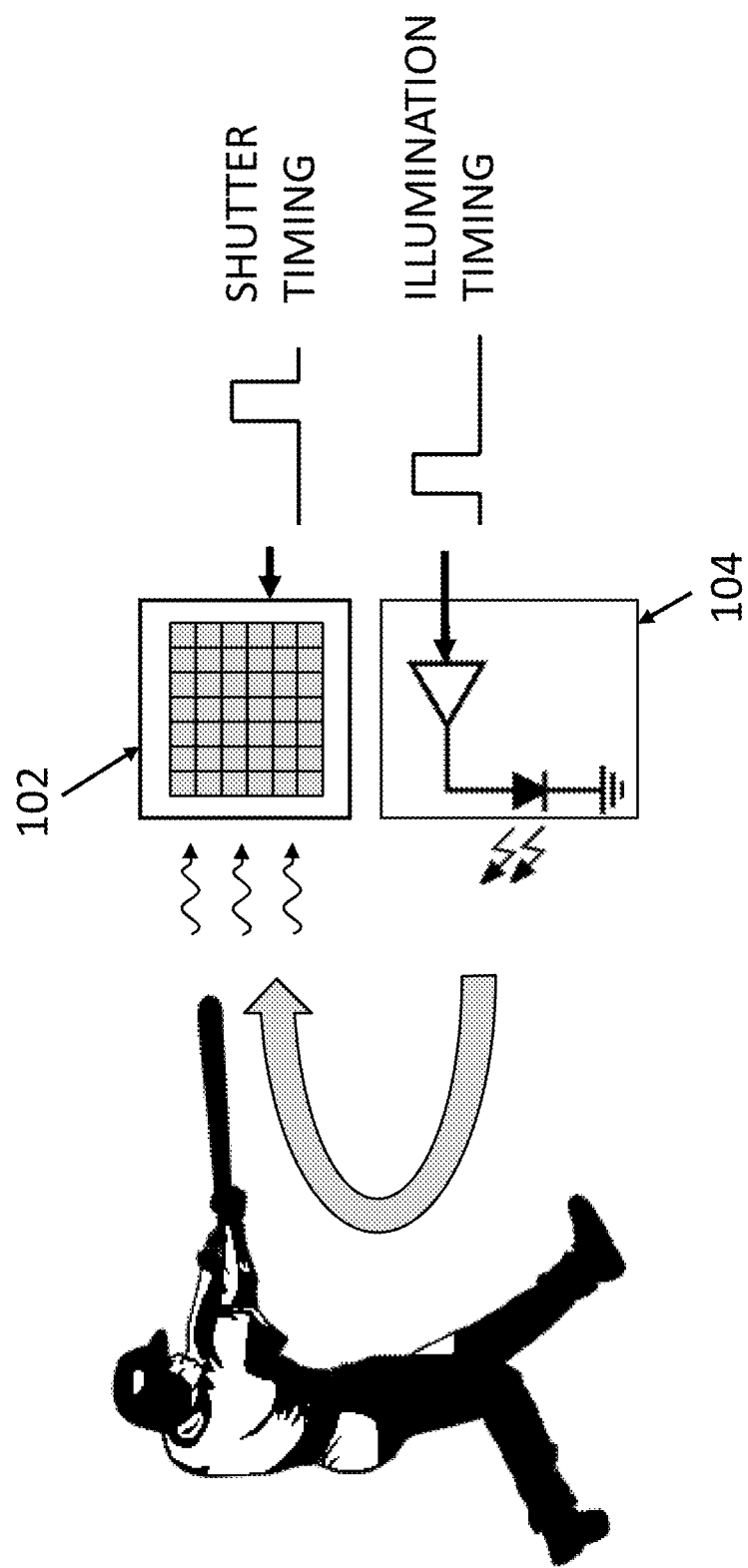
FIG. 1 provides a schematic diagram illustrating an image acquisition system used for time-of-flight measurements.

FIG. 1 shows an exemplary time-of-flight (TOF) image acquisition system, or time-of-flight camera. The time-of-flight camera generally includes an illuminator 104 (which gives off an active illumination pulse or light pulse), and an image sensor 102 with an electronic shutter. Although not shown, the time-of-flight camera would include a component that can compute the distance of an object in the field of view of the camera (e.g., the baseball player, the baseball bat, etc.). Typically, a time-of-flight camera measures scene depth by generating an active illumination pulse using illuminator 104 that reflects off an object in the scene, and by capturing the reflected light in the image sensor 102. For example, the illuminator 104 can include a light-emitting diode or a laser diode which can pulse infrared light at the object in the scene, and reflected light can be captured by the image sensor 102, e.g., a charge coupled device (CCD) image sensor array or other types of image sensor arrays. The illuminator 104 is driven by an electrical pulse which causes the illuminator 104 to flash. The shutter driver of the image sensor 102 is driven by an electrical pulse which causes the shutter to open to allow an image to be captured and/or an image signal to be generated.

Note that the round trip time of the light traveling from the illuminator 104 to the object and from the object to the image sensor 102 would vary based on the distance of the object from the time-of-flight camera. Also, the speed of light is known. Therefore, depending on the distance between the object to the time-of-flight camera, the reflected light hitting the image sensor 102 would have a delay with respect to the time the illuminator 104 generated the light. Based on this information, it is possible to coordinate the phases of the illuminator 104 and the shutter driver of the image sensor 102 to capture the reflected light. By triggering pulses to the illuminator 104 and image sensor 102 with multiple timing phase differences, those phase differences and captured image signals from the image sensor 102 can be directly used to calculate the distance of the object from the camera. One skilled in the art would appreciate that there are several suitable techniques/algorithms that can be used for the time-of-flight camera to determine distance (e.g., techniques leveraging the known phase difference between the illumination and shutter pulses).

In some applications of TOF, the TOF application creates a light pulse chain, e.g. an infrared (IR) light pulse chain, with a laser diode (LD) where a specific phase of the returned light is compared against the original emitted phase. The image sensor, e.g. a CCD image sensor, collects multiple photon packets using the same timing phase that is synchronized with the multiple source IR light pulses. Phrased differently, many of short exposures (e.g., tens or hundreds of exposures) are accumulated for one long exposure, and two or more of these long exposures are captured and processed. To accumulate many short exposures, many light pulses (i.e., the IR light pulse train) are generated, and many short exposures are collected (i.e., electrons for each one of the short exposures is collected in a potential well) to capture one long exposure. Depth errors and motion blur can occur in a TOF image if there is movement that is captured by one phase but not the other. By minimizing the time delay between different phase captures, the errors and artifacts are minimized as well.

Interline Charge-Coupled Devices Able to Capture Multiple Exposures

High performance cameras may be differentiated based on CCD sensor architecture employed therein, e.g. full frame CCD, frame-transfer CCD, or interline-transfer CCD. To accumulate multiple samples (i.e., accumulate charge generated from multiple short exposures on the photodiode) for one long exposure, an interline-transfer CCD (also commonly referred to as an "interline CCD") can be used. Interline CCD sensors typically have alternating columns of photodetecting elements, e.g. photodiodes, that can detect photons and convert them to electrical charge, and columns masked by a light shield. As described in greater detail below, the masked columns do not detect photons and generate charge on their own. Instead the masked columns comprise storage units that are used for storage of charge generated by the photodetecting elements as a result of the photodetecting elements absorbing incident photons during an image frame acquisition. The masked columns are commonly referred to as vertical CCDs, [vertical] CCD shift registers, charge transfer channels, or interline masks. Once the acquisition of an image frame is over, the charge stored in the masked columns is read out.

Figure 2A:
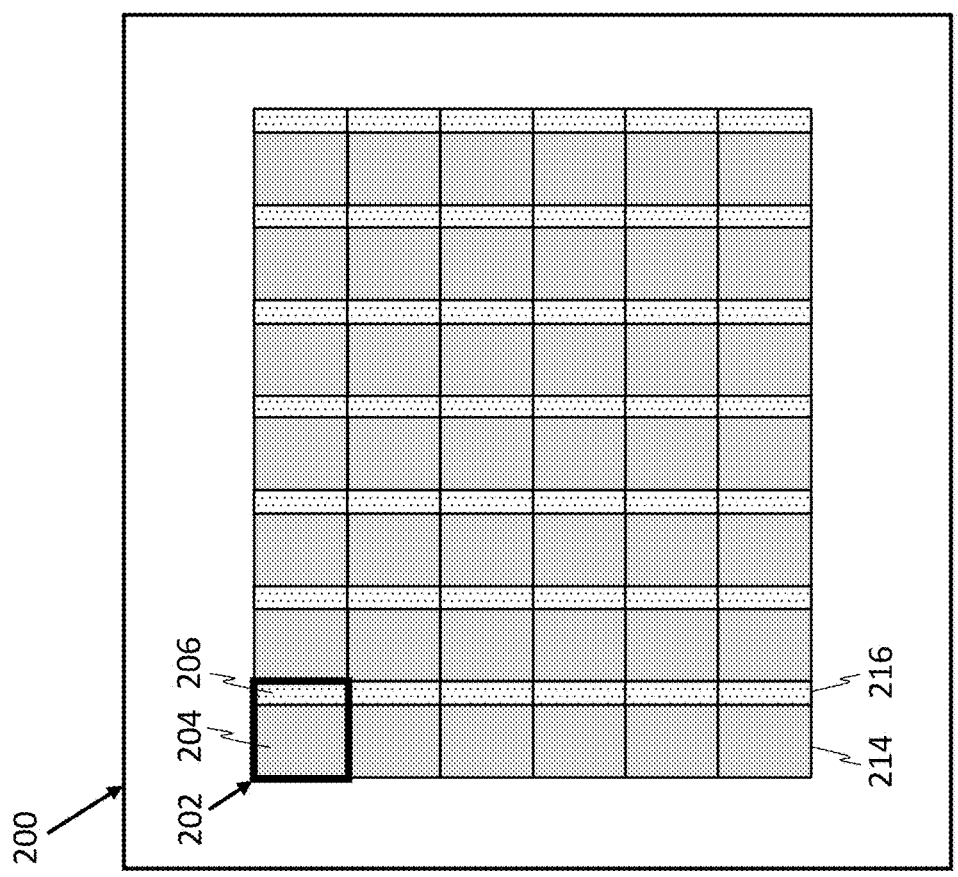
FIG. 2A provides a top view of a conventional interline CCD sensor comprising an array of photodetecting elements and associated storage units.

A conventional interline CCD sensor is shown in FIG. 2A as an interline CCD sensor 200, illustrating an image sensor comprising a grid of interline CCD sensor elements 202 similar to a grid of image sensor elements shown in the image sensor 102 of FIG. 1. As shown in FIG. 2A, each interline CCD sensor element 202 indicated in FIG. 2A with reference to one representative interline CCD sensor element having a thick border around it, includes a photodetecting element 204 or pixel, e.g. a photodiode, indicated with a gray color, similar to the illustration of the image sensor 102. In contrast to the image sensor 102 comprising a continuous grid of pixels exposed to receive light, each of the pixels shown in the interline CCD sensor 200 is associated with an area masked by a light shield (i.e. an area that cannot detect light incident thereon), indicated with a dotted white pattern. Reference numeral 214 in FIG. 2A refers to a column of such photodetecting elements 204, while reference numeral 216 refers to a masked column of storage elements, i.e. a vertical CCD. Typically, a masked storage element 206 is immediately adjacent, or provided in a near vicinity, to a photodetecting element 204 to which the storage element corresponds, so that the charge accumulated in the photodetecting element can be quickly transferred to the storage element. This can be seen from the interline CCD sensor 200 of FIG. 2A illustrating that each masked column or vertical CCD 216 is adjacent to a photodetecting column 214.

Before acquisition of a new image frame begins, the charge is cleared (e.g., drained from the photodetecting columns 214 to the substrate, such as through a vertical or lateral overflow structure). As is well-known, this may be accomplished e.g. by altering voltage on the photodetecting elements or/and the substrate on which the photodetecting elements are provided so that all of the charge that may be generated by the photodetecting elements as a consequence of the photodetecting elements being exposed to light is injected/drained into the substrate (i.e. not accumulated in the photodetecting elements). During the acquisition of an image frame, the pixels of the photodetecting columns accumulate charge (i.e., the charge is not drained). In case an image frame is a multi-exposure image frame, i.e. an image frame acquired using a plurality of relatively short exposures within a relatively long exposure period as e.g. described above for the TOF scenario, during each short exposure of acquisition of a single image frame, the charge generated from the exposure and collected in the photodetecting columns 214 is shifted or transferred to the vertical CCDs 216. The charge that continues accumulating in the photodetecting columns after this short exposure is over and before the next short exposure begins due to the fact that light continues to be incident onto the photodetecting elements may, again, be cleared, or drained, by injecting that charge into the substrate prior to beginning the next short exposure. Draining the charge into the substrate in between the short exposures of acquisition of a multi-exposure image frame effectively implements an electronic shutter of the interline CCD sensor, which is similar to a conventional physical shutter: when the charge is drained into the substrate and is not accumulating in the photodetecting elements (i.e. the "shutter is closed") no charge is added to the storage elements storing the charge representing an image frame, while, however, the charge is accumulating in the photodetecting elements (i.e. the "shutter is open") the collected charge is added to the storage elements.

Many short exposures of a multi-exposure image frame can be captured in this manner, and the charge can be accumulated in the vertical CCDs. In other words, the vertical CCDs accumulate the charge transferred to them from multiple short exposures of the photodetecting columns using electronic shuttering. After sufficient number of short exposures are captured and accumulated in the vertical CCD, the result of a total exposure of a multi-exposure image frame acquisition of an image frame can be read out from the vertical CCDs. Such total exposure is referred to herein as a "long exposure" in order to differentiate it from the multiple, shorter, exposures of a multi-exposure image acquisition which are referred to herein as "short exposures."

An exemplary implementation of the element 202 of the interline CCD sensor 200 comprising a photodetecting element (gray) and a masked CCD storage element (white) is further illustrated in FIGS. 2B-C. As seen in FIGS. 2B-C, each photodetecting element 204, shown as photodiode 204 in FIGS. 2B-C, of the grid of many photodetecting elements of the interline CCD sensor 200, has a masked element comprising the storage unit 206 (e.g., parallel/shift register or potential well for storing charge). Many of such storage units associated with many photodiodes of the CCD form a vertical CCD such as the vertical CCD 216 shown in FIG. 2A.

Charge transfer from the photodiode 204 to the storage unit 206 may be controlled by applying appropriate voltages to the transfer gate 1 (TG1), the substrate gate (SUB), and the CLK gate, shown in FIGS. 2B-C. In this example, the photodiode 206 can collect charge for many short exposures, which flows into the storage unit 206 when TG1 is enabled by applying, to the TG1, a voltage that is sufficiently positive enough relative to the photodiode to allow electrons to flow into the storage unit 206 (typically 5V to 20V), while draining any unwanted charge in the photodiode between each short exposure interval when SUB is enabled by applying, to the SUB, a voltage that is that is sufficiently positive enough relative to the photodiode and TG1 to attract electrons to flow into the substrate (typically 10V to 20V). Once many short exposures have been made and their charge has been transferred from each photodetecting element to a corresponding storage unit of the vertical CCD, a voltage associated with the charge accumulated in the vertical CCD having many of storage units associated with many photodetecting elements is read out, this voltage denoted as VCCD.

Figure 3:
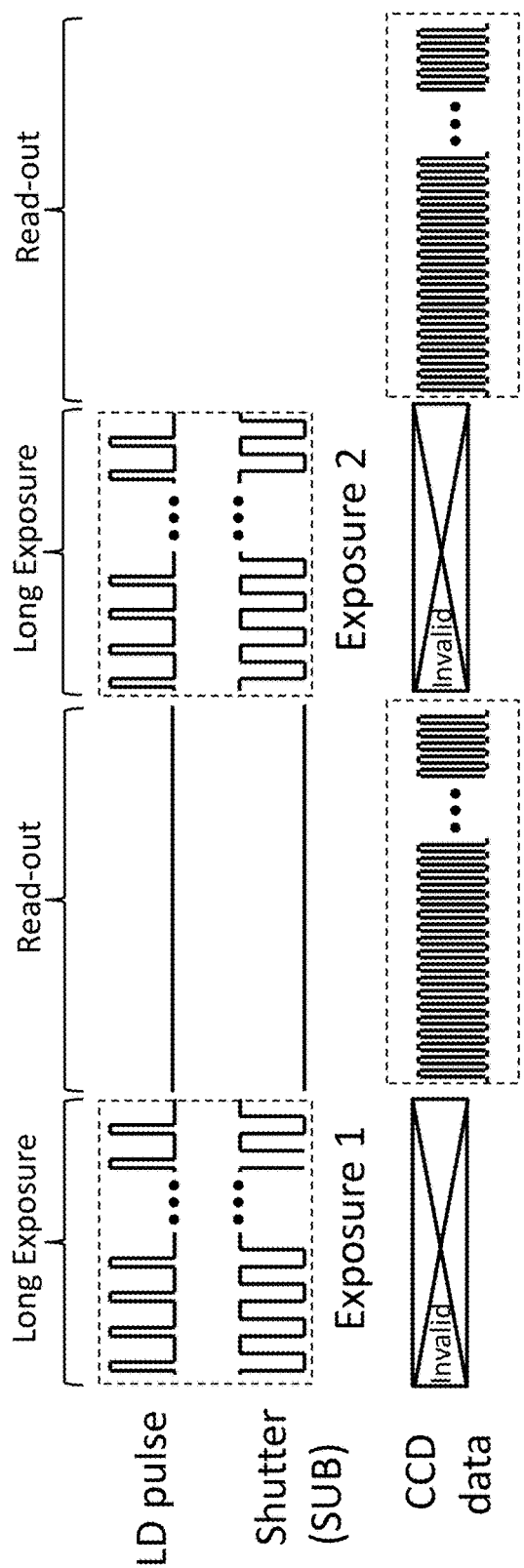
FIG. 3 provides a timing diagram of acquisition and read out of multi-exposure image frames using a conventional interline CCD sensor.

An exemplary timing diagram illustrating operation of an interline CCD sensor, such as e.g. the interline CCD sensor 200, when used in a TOF application where light pulses and shuttered exposures are employed, is shown in FIG. 3. Pulse trains LD and SUB allow many short exposures to be made within a longer period labeled as "Long Exposure" in FIG. 3, while storage unit 206 accumulates charge for each long exposure. It should be noted that in FIG. 3, as well as timing diagrams of FIGS. 6 and 8, transfer of charge from the photodiodes to the storage units of the vertical CCDs is performed during the time period labeled as "Long Exposure."

After enough short exposures are accumulated in the vertical CCD (i.e. a multi-exposure image frame is captured), voltage (VCCD) of each storage unit within each vertical CCD is read out, a process that takes a non-negligible amount of time, typically on the order of several milliseconds, depending on the size of the image array. This is illustrated in FIG. 3 with a read-out period following the first long exposure, Exposure 1, and then with another read-out period following the second long exposure, Exposure 2. During the read-out period following Exposure 1, voltage representing a first multi-exposure image frame is read out from each storage element. Once the VCCD for the first image frame is read out, the voltage may be cleared from the storage elements and charge accumulation of the next long exposure, Exposure 2, for capturing the next multi-exposure image frame may begin. During the read-out period following Exposure 2, voltage representing the second multi-exposure image frame is read out from each storage element. This process of acquiring and reading out multi-exposure image frames may continue as long as necessary.

Using interline CCD sensors is useful in TOF measurements because the vertical CCDs allow charge to be accumulated for a long exposure period, while allowing short individual exposure times in the photodetecting elements by draining unwanted charge through the substrate. However, each long exposure is spaced out in time from a subsequent long exposure due to the limitation that the vertical CCD has to be readout before the next long exposure can begin. This is undesirable, in particular in TOF applications, because it causes errors and artifacts due to the fact that a scene of which an image is acquired may change between the first and second long exposures.

Improved Interline Charge-Coupled Devices

By minimizing the time between different phase captures (e.g., different long exposures), errors and artifacts of an image capturing system, in particular a multi-exposure image frame system used in TOF applications, can be minimized. Various embodiments of the present disclosure provide image capturing systems with interline CCD sensor structures designed to reduce the delay between captures of subsequent image frames. Proposed interline CCD sensors include two or more sets of storage units associated with a given set of photodetecting elements, where each photodetecting element is associated with one storage unit of each of the two or more sets of storage units in that the charge generated by the photodetecting element during the acquisition of a particular image frame (i.e. during a particular exposure period) may be stored in any one of these storage units prior to read-out. Providing multiple sets of storage units for a single set of photodetecting elements allows read-out of charge corresponding to one image frame stored in one set of storage units while accumulating charge corresponding to another image frame in another set of storage units, thus reducing the delay between captures of different image frames and increasing the frame rate. As a result, errors and artifacts of the image capturing system can be minimized.

Various examples illustrating new interline CCD sensor structures designed to simultaneously, or at least in a time-overlapping manner, read out a previously captured image frame while capturing a new image frame to maximize the frame rate while minimizing the delay between captures will now be described. Such examples may be particularly useful for TOF applications where each image frame is a multi-shutter exposure image frame, i.e. where the exposure period during which an image frame is acquired or captured refers to one of the exposure periods described herein as long exposure periods.

Figure 4A:
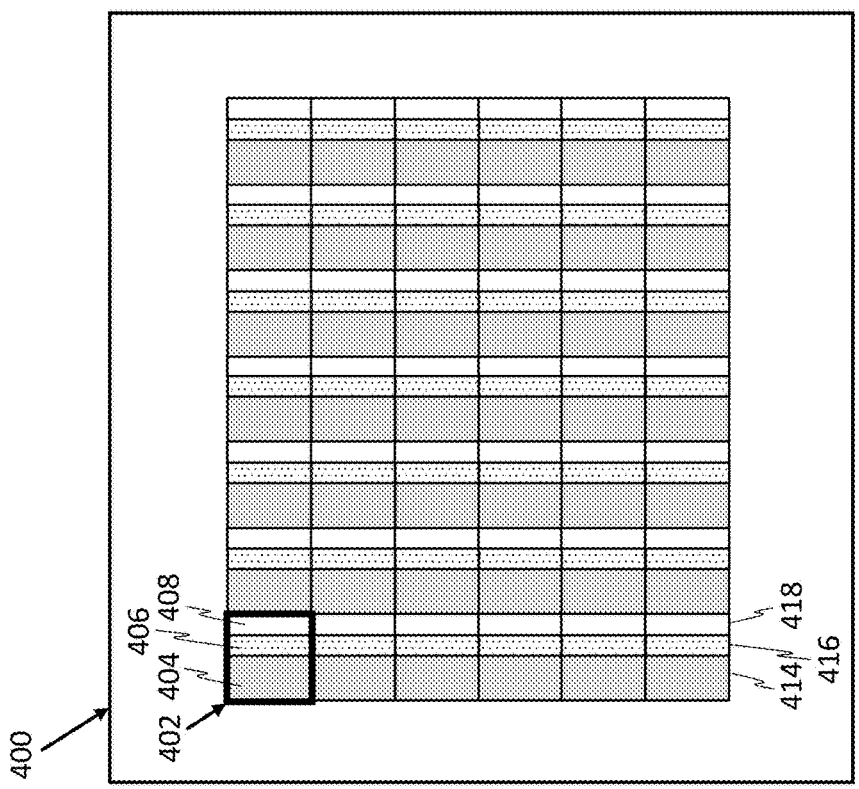
FIG. 4A provides a top view of an interline CCD sensor comprising an array of photodetecting elements and two sets of associated storage units, according to one embodiment of the disclosure.
Figure 7A:
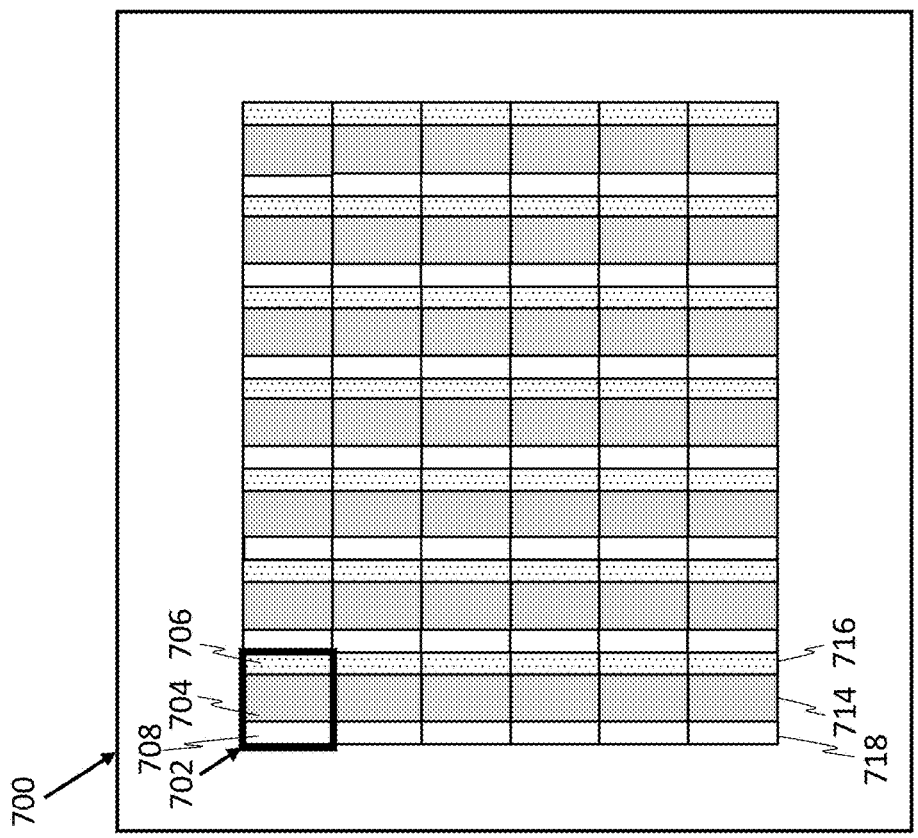
FIG. 7A provides a top view of an interline CCD sensor comprising an array of photodetecting elements and two sets of associated storage units, according to another embodiment of the disclosure.

On some embodiments, rather than having one vertical CCD (or channel) for each column of pixels, as shown with the vertical CCD 214 in FIG. 2A, two vertical CCDs may be provided for each column of pixels to allow the operation to ping-pong or alternate back and forth for virtually unlimited number of exposures with less delay between exposures (when compared with the interline CCD shown and illustrated by FIGS. 2A-C and 3). Examples of interline CCD sensors according to such embodiments are illustrated in FIGS. 4A and 7A, each illustrating an interline CCD sensor structure similar to that shown in FIG. 2A but now having two vertical CCDs associated with each column of photodetecting elements, and described in greater detail in the following subsections as Examples A and B. The new CCD sensor structure, which may be called a "dual vertical CCD" in case there are two vertical CCDs for each column of pixels, stores each new exposure in one of the two vertical CCD memories. Each exposure accumulates multiple shutter exposures for a single image frame, when the new CCD structure is used in a TOF application.

Each photodiode (pixel) of the CCD has two storage units: a first storage unit and a second storage unit (e.g., registers or potential wells for storing charge). Thus, for a given set of photodiodes there are two sets of storage units. For example, one vertical CCD channel having a plurality of first storage units and another vertical channel having a plurality of second storage units may be provided as two separate vertical channels (dual vertical CCDs) for a column of photodiodes. Because two different vertical channels are provided for a single column of photodiodes, one vertical channel can be read out while the other one is accumulating charge for another exposure. An interline CCD controller is configured to ensure that a read-out period during which the charge stored in the set of first storage units is read out (the charge corresponding to the first image frame) at least partially overlaps with an image frame acquisition period during which the photodetecting elements are generating and accumulating charge to be subsequently stored in the set of second storage units.

EXAMPLE A

One Arrangement of a Dual Vertical CCD

One example of a dual CCD sensor structure according to one embodiment of the present disclosure is illustrated in FIGS. 4A-C.

An interline CCD sensor 400 shown in FIG. 4A comprises a grid of interline CCD sensor elements 402 similar to a grid of image sensor elements 202 shown in FIG. 2A. As shown in FIG. 4A, each interline CCD sensor element 402 indicated in FIG. 4A with reference to one representative interline CCD sensor element having a thick border around it, includes a photodetecting element 404 or pixel, e.g. a photodiode, indicated with a gray color, and an area masked by a light shield (i.e. an area that cannot detect light incident thereon) and comprising a storage element 406, indicated with a dotted white pattern. Similar to FIG. 2A, in FIG. 4A, reference numeral 414 refers to a column of such photodetecting elements 404, while reference numeral 416 refers to a masked column of storage elements 406, i.e. a vertical CCD associated with a column of photodetecting elements 414. Unlike the interline CCD sensor shown in FIG. 2A, each photodetecting element 404 is associated not only with the CCD storage element 406 but also with the CCD storage element 408, indicated in FIG. 4A with solid white color. Reference numeral 418 in FIG. 4A refers to the second masked column of storage elements 408, i.e. a second vertical CCD associated with a column of photodetecting elements 414.

Preferably, both masked storage elements 406 and 408 would be provided in relatively near vicinity to a photodetecting element 404 with which these storage elements are associated, so that the charge accumulated in the photodetecting element 404 can be quickly transferred to the storage element 406 and/or storage element 408. FIG. 4A illustrates an embodiment in which the masked storage element 406 is adjacent, or provided in a closer vicinity, to the photodetecting element 404, while the masked storage element 408 is adjacent to the storage element 408. This can be seen from the interline CCD sensor 400 of FIG. 4A illustrating that each first masked column or vertical CCD 416 is adjacent to the photodetecting column 414 and each second masked column or vertical CCD 418 is adjacent to the first column or vertical CCD 416.

An exemplary implementation of the element 402 of the interline CCD sensor 400 comprising a photodetecting element 404 (gray), a first masked CCD storage element 406 (dotted white), and a second masked CCD storage element 408 (solid white) is further illustrated in FIGS. 4B-C, where the photodetecting element 404 is indicated as photodiode 404. As seen in FIGS. 4B-C, each photodiode of many photodiodes of an improved interline CCD image sensor (e.g., photodiode 404) can have two storage units: a first storage unit 406 having a transfer gate TG1 and a second storage unit 408 having a transfer gate TG2. Accordingly, a column 414 of photodiodes can have a first vertical channel VCCD1 416 and a second vertical channel VCCD2 418.

Figures 5A, 5B, 5C:
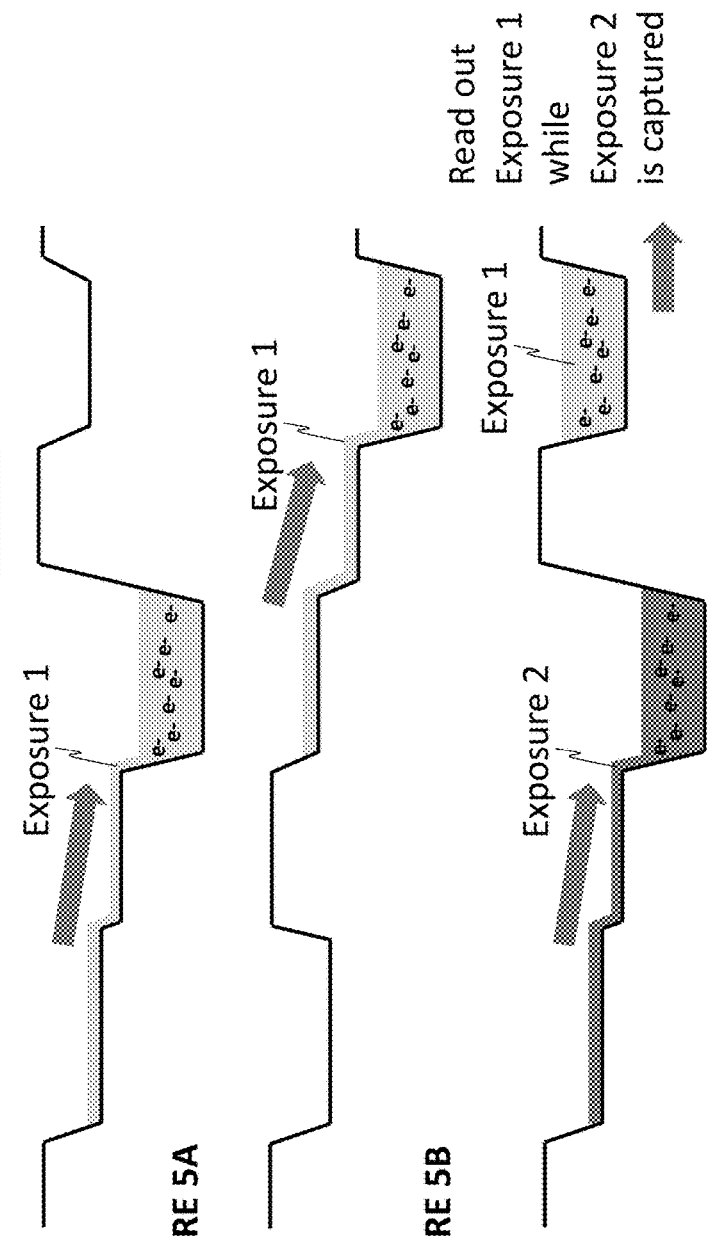
FIG. 5A provides a schematic illustration of relative levels of electrostatic potential during acquisition of a first image frame, according to one embodiment of the disclosure.
FIG. 5B provides a schematic illustration of relative levels of electrostatic potential during transfer of the charge accumulated in a first storage element during the acquisition of the first image frame to a second storage element, according to one embodiment of the disclosure.
FIG. 5C provides a schematic illustration of relative levels of electrostatic potential during acquisition of a second image frame and, simultaneously, a read out of the first image frame from the second storage element, according to one embodiment of the disclosure.

FIGS. 5A-C provide a schematic illustration of changes in the electrostatic (ES) potential at each of the photodiode 404, the first masked CCD storage element 406, the second masked CCD storage element, and their respective transfer gates TG1 and TG2 at different points in time, as could be controlled e.g. by the interline CCD controller described below. Typically, but not necessarily, the same ES potential is applied to the entire column of photodiodes 404 (i.e. column 414), the column of the first vertical CCD 416, and the column of the second vertical CCD 418. For example, a standard construction could be to wire all gates (TG 1, 2) in parallel and drive them by an external voltage-mode driver, where changing the voltage applied by the external voltage-mode driver would change the ES potential.

When the interline CCD controller sets the ES potential as shown in FIG. 5A, the photodiode 404 can collect and transfer charge for a first long exposure (Exposure 1 in the timing diagram of FIG. 6) to the first storage unit 406 using TG1. For TOF, many short exposures are captured and accumulated for one long exposure and the charge is transferred to the first storage unit 406 as it accumulates in the photodiode 404 because the first storage unit 406 is at a lower ES potential than the photodiode 404 and the transfer gate between them is open/enabled. Transfer of charge, accumulated during the first long exposure, from the photodiode 404 to the first storage unit 406 is shown in FIG. 5A with a flow from the photodiode 404 to the first storage unit 406 as indicated in light gray color and labeled as Exposure 1.

As previously described herein, image frame acquisition during a long exposure period having a plurality of short exposures may be accomplished using electronic shuttering by controlling the voltage, e.g. using the interline CCD controller, applied to the photodetecting elements and/or the substrate so that the charge can only be accumulated in the photodiode 404 and, therefore, transferred to the first storage unit 406, during each short exposure. In between the short exposures, the voltage applied to the photodetecting elements and/or the substrate is such that any charge that may be generated by the photodiode 404 is drained into the substrate and, therefore, is not transferred to the first storage unit 406. For example, voltage on the photodiode may be fixed, while variable voltage may be applied to the substrate to ensure that between the short exposures, any charge that may be generated by the photodiode is injected into the substrate.

After the first long exposure, Exposure 1, has been completed, the transfer gate TG1 may be closed/disabled, as shown in FIG. 5B with the ES potential at TG1 being higher than that of the photodiode 404, thus preventing further charge transfer from the photodiode —404 to the first storage unit 406 via the TG1.

At this point, in order to be able to capture the next exposure, the charge collected for the first long exposure, Exposure 1 is transferred to the second storage unit 408 using TG2, as shown in FIG. 5B. Once transferred, the transfer gate TG2 is closed/disabled, as shown in FIG. 5C with the ES potential at TG2 being higher than that of the first storage unit 406, thus preventing further charge transfer from the first storage unit 406 to the second storage unit 408 via the TG2.

As shown in FIG. 5C, now the charge collected for the first long exposure is transferred to and isolated in the second storage unit 408 by the ES potential barriers, and the photodiode 404 can collect and transfer charge for a second long exposure (again, having many short exposures) to the first storage unit using TG1 in the manner similar to that described above for the first long exposure. Transfer of charge, accumulated during the second long exposure, from the photodiode 404 to the first storage unit 406 is shown in FIG. 5C with a flow from the photodiode 404 to the first storage unit 406 as indicated in dark gray color and labeled as Exposure 2. While the second exposure is being captured as shown in FIG. 5C, it is possible to read out voltage VCCD2 at the second storage element 408 to obtain the first exposure, a process that, again, could be controlled by the interline CCD controller.

Figure 6:
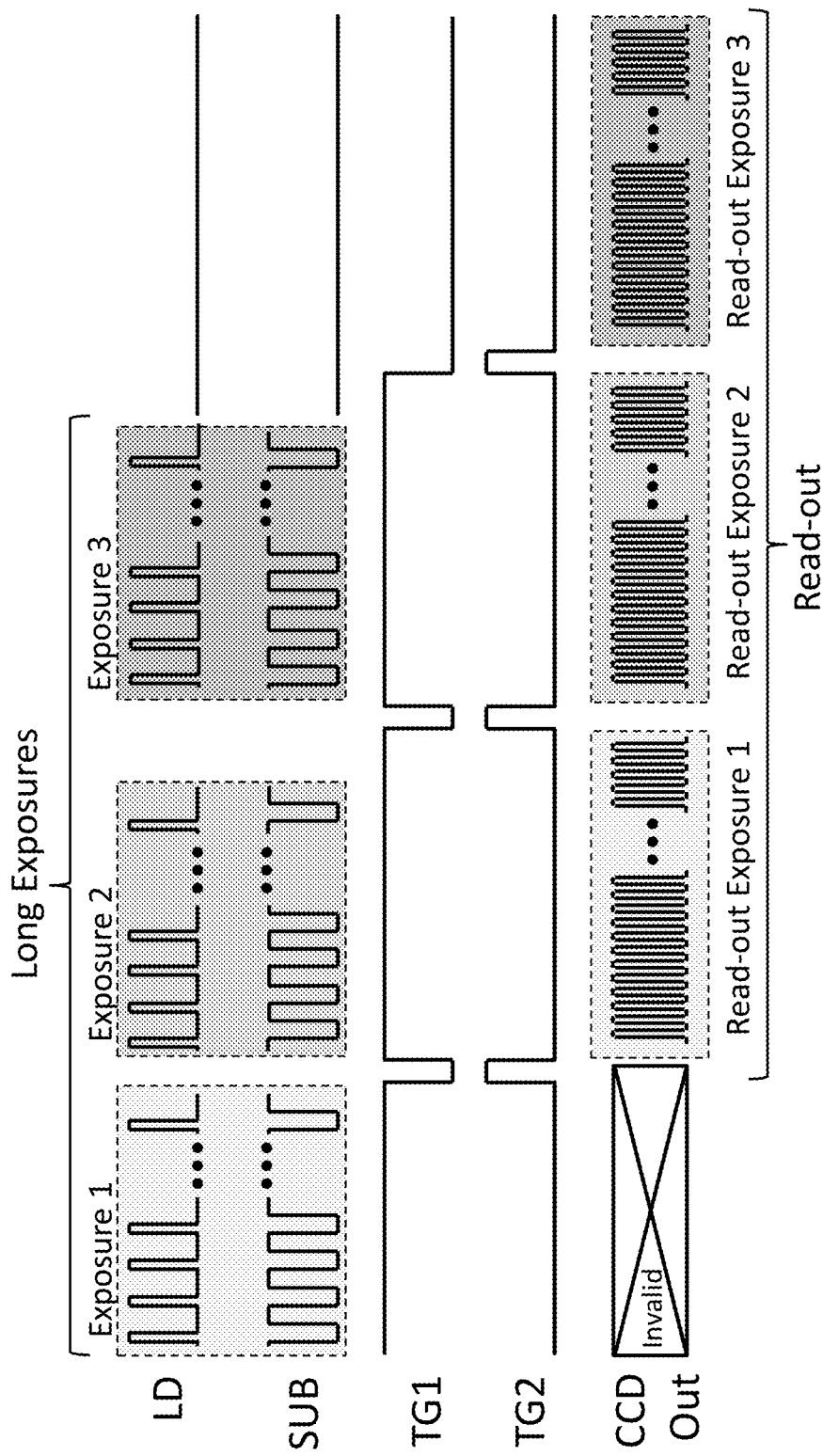
FIG. 6 provides a timing diagram of acquisition and read out of multi-exposure image frames using the interline CCD sensor shown in FIG. 4A, according to one embodiment of the disclosure.

An exemplary timing diagram illustrating operation of the interline CCD sensor as shown in FIG. 4A and described above, when used in a TOF application, is shown in FIG. 6. Multiple shutter exposures (SUB) can be used for each long exposure, three of which are shown in FIG. 6 as Exposure 1, Exposure 2, and Exposure 3. Because there are two storage elements associated with each photodetecting elements, image frame acquisition (i.e. long exposure) and read-out operations can occur simultaneously or at least overlap in time, as can be seen in FIG. 6: e.g. the read-out of the image frame acquiring during Exposure 1 takes place simultaneously with the acquisition of the next image frame during Exposure 2, the read-out of the image frame acquiring during Exposure 2 takes place simultaneously with the acquisition of the next image frame during Exposure 3, and so on. In addition, as described above with reference to FIGS. 5A-C, acquisition of a new image frame (i.e. a new long exposure) must wait until the previous image frame (i.e. the charge accumulated during the previous long exposure) is transferred from the first to the second storage element via transfer gate TG2. This can be seen in FIG. 6 as well by noting that during the time periods between subsequent long exposures, e.g. between Exposure 1 and Exposure 2 or between Exposure 2 and Exposure 3, transfer gate TG1 is closed (control signal TG1 is low) which means that there is no charge transfer from the photodetecting element 404 to the first storage element 406, while transfer gate TG2 is open (control signal TG2 is high) which means that there is charge transfer from the first storage element 406 to the second storage element 408.

EXAMPLE B

Alternate Arrangement of the Dual Vertical CCD

The improved interline CCD sensor of Example A, described above with reference to FIGS. 4A-C, 5, and 6, comprises two storage elements provided on a single lateral side of each photodetecting element, e.g. two vertical CCDs on one side of the column of the photodetecting elements. Such configuration may be advantageous because it may easily be combined with existing photodiode designs which already use a single interline V-CCD. However, other arrangements are also possible. Example B illustrates that, in some embodiments, the two storage elements associated with a photodetecting element can be provided on two or more different lateral sides of the photodetecting element, e.g. the two vertical CCDs can be provided on two different sides of the column of photodiodes. Accordingly, one exemplary photodiode (pixel) of the CCD has two storage units (e.g., registers or potential wells for storing charge): a first storage unit having a transfer gate TG1 and a second storage unit having a transfer gate TG2. One vertical channel having many first storage units and another vertical channel having many second units are provided (as two separate vertical channels (dual vertical CCDs)) for a column of photodiodes. Because two different vertical channels are provided for a column of photodiodes, one vertical channel can be readout while the other one is accumulating charge for another exposure. This is illustrated in FIGS. 7A-C showing an example, where the two vertical CCDs, VCCD1 and VCCD2, are provided on the opposite sides of photodiodes.

An interline CCD sensor 700 shown in FIG. 7A comprises a grid of interline CCD sensor elements 702 similar to a grid of image sensor elements 402 shown in FIG. 4A. As shown in FIG. 7A, each interline CCD sensor element 702 indicated in FIG. 7A with reference to one representative interline CCD sensor element having a thick border around it, includes a photodetecting element 704 or pixel, e.g. a photodiode, indicated with a gray color, a first area masked by a light shield (i.e. an area that cannot detect light incident thereon) and comprising a first storage element 706, indicated with a dotted white pattern, and second area masked by a light shield and comprising a second storage element 708, indicated with a solid white pattern. Similar to FIG. 4A, in FIG. 7A, reference numeral 714 refers to a column of photodetecting elements 704, reference numeral 716 refers to a masked column of a first set of storage elements 706, i.e. a first vertical CCD associated with a column of photodetecting elements 714, and reference numeral 718 in FIG. 7A refers to a masked column of a second set of storage elements 708, i.e. a second vertical CCD associated with a column of photodetecting elements 714. Unlike the interline CCD sensor shown in FIG. 4A, where the first and second columns 416 and 418 where provided on the same side of the photodiode column 414, in the example shown in FIG. 7A, the first and second masked columns 716 and 718 are provided on the different sides of the photodiode column 714.

Similar to Example A, preferably, both masked storage elements 706 and 708 would be provided in relatively near vicinity to a photodetecting element 704 with which these storage elements are associated, so that the charge accumulated in the photodetecting element 704 can be quickly transferred to the storage element 706 and/or storage element 708. FIG. 7A illustrates an embodiment in which the masked storage element 706 is adjacent, or provided in a closer vicinity, to one side of the photodetecting element 704, while the masked storage element 708 is adjacent, or provided in a closer vicinity, to the opposite side of the photodetecting element 704. This can be seen from the interline CCD sensor 700 of FIG. 7A illustrating that each first masked column or vertical CCD 716 is adjacent to one side of the photodetecting column 714 and each second masked column or vertical CCD 718 is adjacent to the opposite side of the photodetecting column 714. In other embodiments, it is also possible to provide one vertical CCD and one horizontal CCD for each column of photodetecting elements so that the two storage units associated with each respective photodetecting element are on adjacent sides of the photodetecting element (not shown in FIGURES).

The operation of the dual vertical CCD structure in FIGS. 7A-C may differ from the dual vertical CCD structure in FIGS. 4A-B. For the dual vertical CCD structure shown in FIGS. 7A-B, the photodiode 704 can collect and transfer charge for a first image frame acquired during the first long exposure, Exposure 1 (having many short exposures), to the first storage unit using TG1 (for TOF, many short exposures are captured and accumulated for one long exposure). To capture the next exposure, the photodiode 704 can collect and transfer charge for a second image frame acquired during the second long exposure, Exposure 2 (having many short exposures), to the second storage unit using TG2. While the second image frame is being captured in VCCD2, during Exposure 2, it is possible to read out VCCD1 to obtain the first image frame that was previously captured in Exposure 1 time period. Again, the interline CCD controller may be configured to control such operation.

Figure 8:
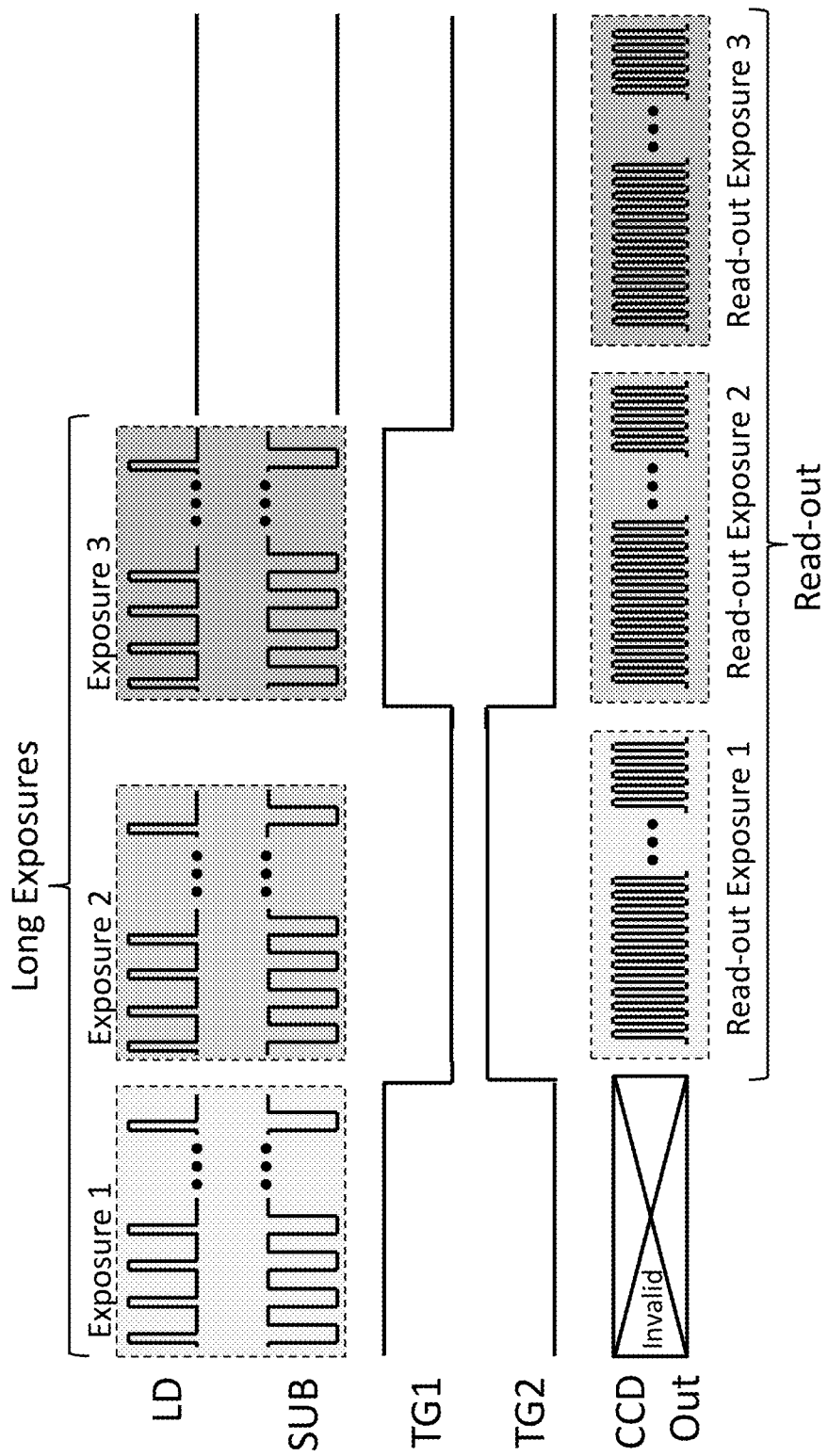
FIG. 8 provides a timing diagram of acquisition and read out of multi-exposure image frames using the interline CCD sensor shown in FIG. 7A, according to one embodiment of the disclosure.

An exemplary timing diagram illustrating operation of the interline CCD sensor as shown in FIG. 7A, when used in a TOF application, is shown in FIG. 8. Multiple shutter exposures (SUB) can be used for each long exposure, three of which are shown in FIG. 8 as Exposure 1, Exposure 2, and Exposure 3. Similar to Example A, in case of Example B, because there are two storage elements associated with each photodetecting elements, image frame acquisition (i.e. long exposure) and read-out operations can occur simultaneously or at least overlap in time, as can be seen in FIG. 8: e.g. the read-out of the image frame acquiring during Exposure 1 takes place simultaneously with the acquisition of the next image frame during Exposure 2, the read-out of the image frame acquiring during Exposure 2 takes place simultaneously with the acquisition of the next image frame during Exposure 3, and so on. In contrast to Example A, according to Example B, one acquisition of an image frame is completed, acquisition of a new image frame (i.e. a new long exposure) may begin immediately (but, of course, does not have to). This can be seen in FIG. 8 by noting that as soon as the transfer gate TG1 becomes closed once the first image frame is captured during Exposure 1, meaning that there is no longer charge transfer from the photodiode 704 to the first storage element 706, the transfer gate TG2 opens to acquire the next image frame during Exposure 2, meaning that there is now charge transfer from the photodiode 704 to the second storage element 708, and so on.

Characteristic of the particular implementation shown in FIG. 7A is that acquisition of the third image frame (Exposure 3) does need to wait until read-out of the first image frame (Exposure 1) is complete and the first vertical CCD 716 is cleared of charge because the charge accumulated during Exposure 3 will again be stored in the first vertical CCD 716.

Exemplary Interline CCD Image Acquisition System

Figure 9:
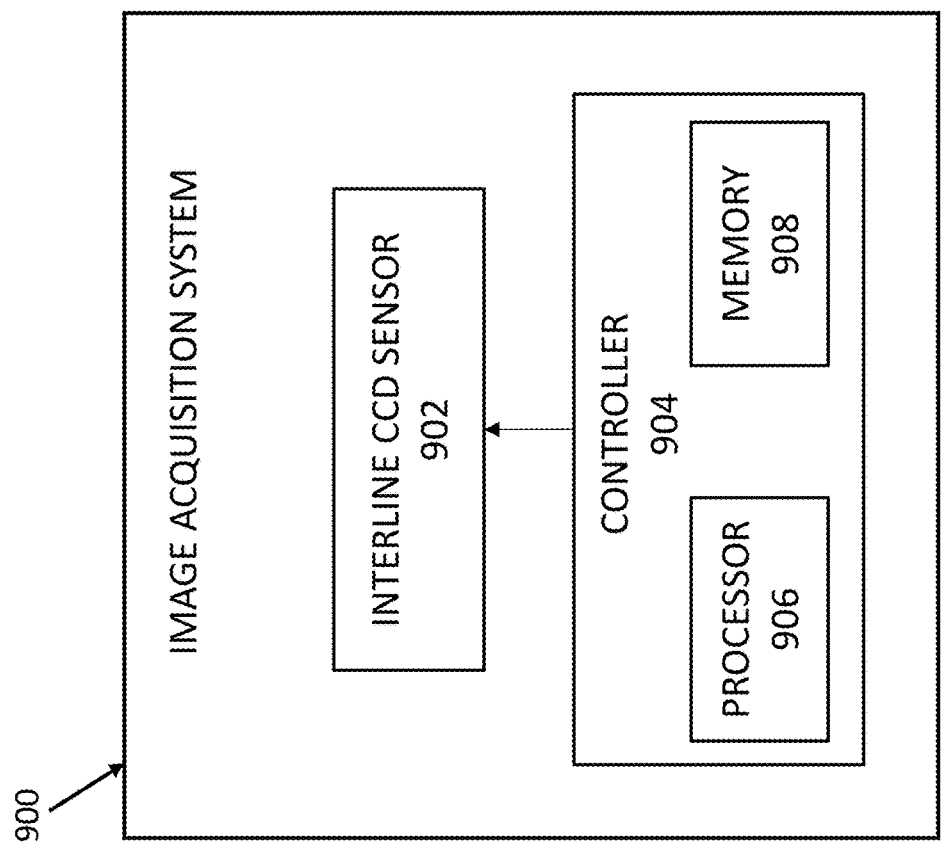
FIG. 9 illustrates a system view of an exemplary apparatus configured to implement improved image acquisition and read out techniques of an interline CCD sensor, according to some embodiments of the disclosure.

FIG. 9 illustrates a system view of an exemplary image acquisition apparatus 900 configured to implement improved image acquisition and read-out techniques of an interline CCD sensor, according to some embodiments of the disclosure. As shown, such an apparatus includes at least an interline CCD sensor 902 implementing two or more CCD storage elements per each photodetecting pixel, e.g. the interline CCD sensor 400 or the interline CCD sensor 700. Although only one interline CCD sensor is shown in FIG. 9, the image acquisition system 900 may, optionally, include a plurality of such interline CCD sensors. The image acquisition system 900 may further include a controller 904 configured to at least generate the control signals and/or modify ES potential levels on one of more of the elements of the interline CCD sensor 902 (e.g. one or more of: the photodetecting elements of the interline CCD sensor 902, the first storage elements associated with each of the photodetecting elements of the interline CCD sensor 902, the transfer gates enabling charge transfer to the first storage elements associated with each of the photodetecting elements of the interline CCD sensor 902, the second storage elements associated with each of the photodetecting elements of the interline CCD sensor 902, and the transfer gates enabling charge transfer to the second storage elements associated with each of the photodetecting elements of the interline CCD sensor 902) in the manner described herein to enable acquisition of one image frame while reading out another image frame, in accordance with the improved interline CCD techniques described herein. To that end, in some embodiments, the controller 904 may include at least a processor 906 and a memory 908, as shown in FIG. 9, configured to implement various improved image acquisition and read-out techniques described herein.

While FIG. 9 illustrates the controller 904 to be included within the image acquisition system 900, in other embodiments, the controller 904 may be implemented external to the image acquisition system 900, in which case the controller 904 may be configured to control the image acquisition system 900, in particular control the interline CCD sensor 902, remotely, via any appropriate communication channel. In other words, instead of being implemented within the image acquisition system 900 as shown in FIG. 9, the controller 904 may be external to the image acquisition system 900 and be communicatively coupled to the image acquisition system 900.

As previously described herein, the ability to simultaneously capture and readout multi-shuttered images allows the interline CCD sensor, e.g. the sensor 902, to be effectively used for a Time of Flight depth sensing application when coupled with a light source such as a laser diode or LED, a precision timing generator, and a high speed analog front-end (AFE), each of which could also be included within the image acquisition system 900 or communicatively coupled thereto (not shown in the FIGURES). Implementing multiple CCD storage elements, e.g. dual vertical CCDs, in an interline CCD sensor enables a system that has little delay between different phase captures, thus reducing errors and artifacts of the image capturing system 900 when used in TOF applications. For instance, the motion blur artifacts that can be caused by the delay in capturing different phases used to determine depth may be reduced or minimized.

In some embodiments, the active photodiode area fill factor may be maximized through compact layout of the storage elements associated with each photodetecting element, possibly along with the use of a microlens over each photodetecting element, while still supporting a simultaneous read-out to maintain the maximum sensor efficiency, minimize sensor size, and minimize sensor cost. Furthermore, the number of successive image captures is virtually unlimited, allowing the improved interline CCD sensor described herein, e.g. dual vertical CCD sensor, to make as many different phase captures as desired.

Exemplary Data Processing System

Figure 10:
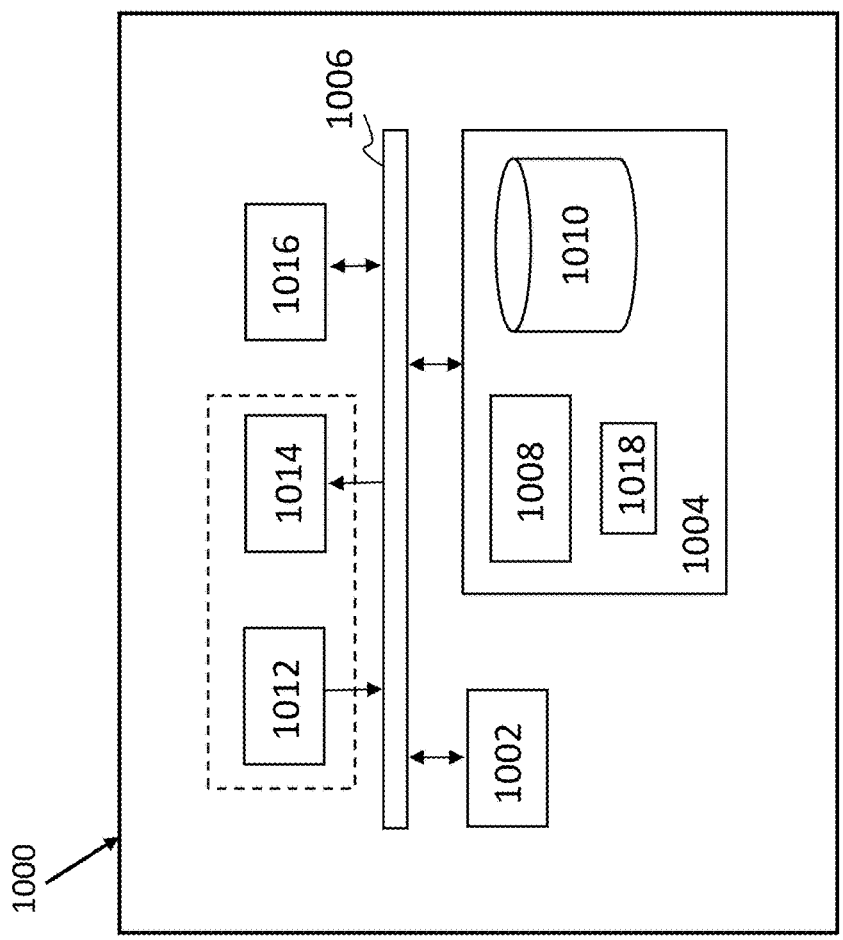
FIG. 10 depicts a block diagram illustrating an exemplary data processing system, according to some embodiments of the disclosure.

FIG. 10 depicts a block diagram illustrating an exemplary data processing system 10, according to one embodiment of the present disclosure. Such a data processing system could be configured to e.g. function as the controller 904 described herein or as any other system configured to implement various improved interline CCD image acquisition and read-out techniques described herein.

As shown in FIG. 10, the data processing system 1000 may include at least one processor 1002 coupled to memory elements 1004 through a system bus 1006. As such, the data processing system may store program code within memory elements 1004. Further, the processor 1002 may execute the program code accessed from the memory elements 1004 via a system bus 1006. In one aspect, the data processing system may be implemented as a computer that is suitable for storing and/or executing program code. It should be appreciated, however, that the data processing system 1000 may be implemented in the form of any system including a processor and a memory that is capable of performing the functions described within this specification.

The memory elements 1004 may include one or more physical memory devices such as, for example, local memory 1008 and one or more bulk storage devices 1010. The local memory may refer to random access memory or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from the bulk storage device 1010 during execution.

Input/output (I/O) devices depicted as an input device 1012 and an output device 1014, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 1012 and the output device 1014). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1016 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1000, and a data transmitter for transmitting data from the data processing system 1000 to said systems, devices and/or networks. Modems, cable modems, and Ethernet cards are examples of different types of network adapter that may be used with the data processing system 1000.

As pictured in FIG. 10, the memory elements 1004 may store an application 1018. In various embodiments, the application 1018 may be stored in the local memory 1008, the one or more bulk storage devices 1010, or apart from the local memory and the bulk storage devices. It should be appreciated that the data processing system 1000 may further execute an operating system (not shown in FIG. 10) that can facilitate execution of the application 1018. The application 1018, being implemented in the form of executable program code, can be executed by the data processing system 1000, e.g., by the processor 1002. Responsive to executing the application, the data processing system 1000 may be configured to perform one or more operations or method steps described herein.

Selected Examples

Example 1 provides an image acquisition system, e.g. to be used in or as a TOF system. The image acquisition system includes an interline CCD sensor and a controller for controlling the operation of the interline CCD sensor. The interline CCD sensor includes a plurality of photodetecting elements, a plurality of first CCD storage units which are separate from (i.e. not the same as) the plurality of the photodetecting elements, and a plurality of second CCD storage units which are separate from (i.e. not the same as) the plurality of the photodetecting elements and the plurality of first CCD storage units. The plurality of first CCD storage units are configured for storing a charge accumulated by the plurality of photodetecting elements during an acquisition of one image frame comprising multiple exposures and the plurality of second CCD storage units are configured for storing a charge accumulated by the plurality of photodetecting elements during an acquisition of another image frame comprising multiple exposures. Thus, each of the acquisition of said one image frame and the acquisition of said another image frame is a multi-exposure (or multi-shutter) acquisition. In other words, each of the plurality of first CCD storage units and the plurality of second CCD storage units is configured for storing a total charge for a single multiple-exposure image frame as a sum of charges stored by the plurality of photodetecting elements during each of the multiple exposures of that image frame (the first and second CCD units storing the total charge for different multi-exposure image frames). The controller is configured to ensure that at least a part of the charge accumulated during the acquisition of one image frame is read out during the acquisition of another image frame.

Example 2 provides the image acquisition system according to Example 1, where each photodetecting element of the plurality of photodetecting elements is associated with a different one first CCD storage unit of the plurality of first CCD storage units and with a different one second CCD storage unit of the plurality of second CCD storage units.

Example 3 provides the image acquisition system according to Example 2, where the first CCD storage unit associated with the photodetecting element is provided (disposed) on the same lateral side of the photodetecting element as the second CCD storage unit associated with the photodetecting element.

Example 4 provides the image acquisition system according to any one of Examples 1-3, where said one image frame is a second image frame and said another image frame is a first image frame, and the controller is configured to ensure that the plurality of photodetecting elements transfer the charge accumulated by the plurality of photodetecting elements during the acquisition of the first image frame to the plurality of first CCD storage units, the plurality of first CCD storage units transfer the charge accumulated during the acquisition of the first image frame and obtained from the plurality of photodetecting elements to the plurality of second CCD storage units, and following the transfer from the plurality of the first CCD storage units to the plurality of second CCD storage units, the plurality of photodetecting elements transfer the charge accumulated by the plurality of photodetecting elements during the acquisition of the second image frame to the plurality of first CCD storage units.

Example 5 provides the image acquisition system according to Example 2, where the first CCD storage unit associated with the photodetecting element is provided (disposed) on a different (e.g. opposite) lateral side of the photodetecting element as the second CCD storage unit associated with the photodetecting element. In other Examples, the first CCD storage units and the second CCD storage units may be provided/disposed in any location with respect to the photodetecting elements with which they are associated.

Example 6 provides the image acquisition system according to any one of Examples 1, 2, and 5, where said one image frame is a first image frame and said another image frame is a second image frame, and the controller is configured to ensure that the plurality of photodetecting elements transfer the charge accumulated by the plurality of photodetecting elements during the acquisition of the first image frame to the plurality of first CCD storage units, and the plurality of photodetecting elements transfer the charge accumulated by the plurality of photodetecting elements during the acquisition of the second image frame to the plurality of second CCD storage units.

Example 7 provides the image acquisition system according to Examples 5 or 6, where the plurality of first CCD storage units includes a vertical CCD while the plurality of second CCD storage units includes a horizontal CCD or vice versa.

Example 8 provides the image acquisition system according to any one of Examples 1-6, where each of the plurality of first CCD storage units and the plurality of second CCD storage units includes a vertical CCD or each of the plurality of first CCD storage units and the plurality of second CCD storage units includes a horizontal CCD.

Example 9 provides the image acquisition system according to any one of the preceding Examples, further including an illumination source configured to provide light detected by the plurality of photodetecting elements.

Example 10 provides the image acquisition system according to Example 9, where the light provided by the illumination source includes pulsed light.

Example 11 provides the image acquisition system according to Example 10, where the image acquisition system is a Time-Of-Flight system, further including one or more processors configured to determine distance to one or more objects based on the acquired image frames.

Example 12 provides a computer-implemented method for controlling an interline charge-coupled device (CCD) sensor including a plurality of photodetecting elements, a plurality of first CCD storage units for storing a charge accumulated by the plurality of photodetecting elements during an acquisition of one image frame, and a plurality of second CCD storage units for storing a charge accumulated by the plurality of photodetecting elements during an acquisition of another image frame, the method including ensuring that at least a part of the charge accumulated during the acquisition of one image frame including multiple exposures is read out during the acquisition of another image frame including multiple exposures.

Example 13 provides the computer-implemented method according to Example 12, where said one image frame is a second image frame and said another image frame is a first image frame, and the method further includes ensuring that the plurality of photodetecting elements transfer the charge accumulated by the plurality of photodetecting elements during the acquisition of the first image frame to the plurality of first CCD storage units, ensuring that the plurality of first CCD storage units transfer the charge accumulated during the acquisition of the first image frame and obtained from the plurality of photodetecting elements to the plurality of second CCD storage units, and ensuring that, following the transfer from the plurality of the first CCD storage units to the plurality of second CCD storage units, the plurality of photodetecting elements transfer the charge accumulated by the plurality of photodetecting elements during the acquisition of the second image frame to the plurality of first CCD storage units.

Example 14 provides the computer-implemented method according to Example 12, where said one image frame is a second image frame and said another image frame is a first image frame, and the method further includes ensuring that the plurality of photodetecting elements transfer the charge accumulated by the plurality of photodetecting elements during the acquisition of the first image frame to the plurality of first CCD storage units, and ensuring the plurality of photodetecting elements transfer the charge accumulated by the plurality of photodetecting elements during the acquisition of the second image frame to the plurality of second CCD storage units.

Example 15 provides the computer-implemented method according to any one of Examples 12-14, further including performing Time-Of-Flight computations to determine distance to one or more objects based on the acquired image frames.

Example 16 provides a non-transitory computer readable storage medium storing software code portions configured for, when executed on a processor, carrying out a method for controlling an interline charge-coupled device (CCD) sensor including a plurality of photodetecting elements, a plurality of first CCD storage units for storing a charge accumulated by the plurality of photodetecting elements during an acquisition of one image frame, and a plurality of second CCD storage units for storing a charge accumulated by the plurality of photodetecting elements during an acquisition of another image frame, the method including ensuring that at least a part of the charge accumulated during the acquisition of one image frame including multiple exposures is read out during the acquisition of another image frame including multiple exposures.

Example 17 provides the non-transitory computer readable storage medium according to Example 16, where said one image frame is a second image frame and said another image frame is a first image frame, and the software code portions are further configured for ensuring that the plurality of photodetecting elements transfer the charge accumulated by the plurality of photodetecting elements during the acquisition of the first image frame to the plurality of first CCD storage units, ensuring that the plurality of first CCD storage units transfer the charge accumulated during the acquisition of the first image frame and obtained from the plurality of photodetecting elements to the plurality of second CCD storage units, and ensuring that, following the transfer from the plurality of the first CCD storage units to the plurality of second CCD storage units, the plurality of photodetecting elements transfer the charge accumulated by the plurality of photodetecting elements during the acquisition of the second image frame to the plurality of first CCD storage units.

Example 18 provides the non-transitory computer readable storage medium according to Example 16, where said one image frame is a second image frame and said another image frame is a first image frame, and the software code portions are further configured for ensuring that the plurality of photodetecting elements transfer the charge accumulated by the plurality of photodetecting elements during the acquisition of the first image frame to the plurality of first CCD storage units, and ensuring the plurality of photodetecting elements transfer the charge accumulated by the plurality of photodetecting elements during the acquisition of the second image frame to the plurality of second CCD storage units.

Example 19 provides the non-transitory computer readable storage medium according to any one of Examples 16-18, where the software code portions are further configured for performing Time-Of-Flight computations to determine distance to one or more objects based on the acquired image frames.

Example 20 provides a computer program product comprising computer-readable instructions which configure a processor to carry out methods and functionality described herein.

Variations and Implementations

It is noted that the illustrations in the FIGURES do not necessary represent true layout, orientation, sizing, and/or geometry of an actual CCD. It is envisioned by the disclosure that various suitable layouts can be designed and implemented for the interline CCD sensor having multiple CCD channels associated with each set of photodetecting elements, where one CCD channel can be readout while the other channel accumulates charge for another exposure. Based on the descriptions provided above, a person of ordinary skill in the art can easily envision various further embodiments and configurations of using two or more CCD storage elements associated with each single photodetecting element of an interline CCD sensor, all of which are within the scope of the present disclosure.

For example, in various embodiments of the improved interline CCD sensors described herein, two or more CCDs associated with each photodetecting element may be biased at the same or different potential levels, which could also be controlled by the interline CCD controller.

While present disclosure provides examples for dual CCD channels, teachings provided herein can easily be extended to any number of CCD channels greater than 1, per a set of photodetecting elements. Further, various embodiments having vertical channels can be modified to accommodate horizontal or diagonal channels, when suitable, since horizontal and/or diagonal channels can provide equivalent functions as linear storage for rows or columns of CCDs.

It is possible that each photodetecting element, e.g. each photodiode, can have more than two storage units in each CCD channel. For instance, instead of having just one storage unit for each photodiode in VCCD1 and one storage unit for each photodiode in VCCD2, each photodiode can have two or more storage units in VCCD1, and/or two or more storage units in VCCD2. Two or more exposures can be captured in each vertical channel before read-out, while maintaining the advantage of being able to read out from one vertical channel while the other vertical channel is accumulating charge for an exposure.

It is possible to have more than two vertical channels, i.e., more than two storage units belonging to respective vertical channels.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

Parts of various apparatuses/devices described herein can include electronic circuitry to perform the functions described herein. In some cases, one or more parts of the apparatus can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer medium.

In one example embodiment, any number of electrical circuits and integrated circuitry of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the improved charge-coupled device, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the disclosure and appended claims (if any). Note that all optional features of the apparatus described above may also be implemented with respect to the method or process described herein and specifics in the examples may be used anywhere in one or more embodiments.

Although the claims are presented in single dependency format in the style used before the USPTO, it should be understood that any claim can depend on and be combined with any preceding claim of the same type unless that is clearly technically infeasible.

What is claimed is:

1. An image acquisition system comprising:
   an interline charge-coupled device (CCD) sensor comprising
      a plurality of photodetecting (PD) elements,
      a plurality of first CCD storage units for storing a charge accumulated by the plurality of PD elements during an acquisition of one image frame comprising multiple exposures, and
      a plurality of second CCD storage units for storing a charge accumulated by the plurality of PD elements during an acquisition of another image frame comprising multiple exposures,
      wherein the charge accumulated by the plurality of PD elements during the acquisition of the one image frame and of the another image frame is transferred from the plurality of PD elements by keeping a transfer gate for each of the plurality of PD elements open during the acquisition of the one image frame and of the another image frame and varying a substrate voltage to drain a portion of the charge accumulated by the plurality of PD elements in between the multiple exposures of each of the one image frame and the another image frame out of the plurality of PD elements; and
   a controller for controlling that at least a part of the charge accumulated during the acquisition of the one image frame is read out during the acquisition of the another image frame.

2. The image acquisition system according to claim 1, wherein each PD element of the plurality of PD elements is associated with a first CCD storage unit of the plurality of first CCD storage units and with a second CCD storage unit of the plurality of second CCD storage units.

3. The image acquisition system according to claim 2, wherein the first CCD storage unit associated with the PD element is provided on the same lateral side of the PD element as the second CCD storage unit associated with the PD element.

4. The image acquisition system according to claim 2, wherein the first CCD storage unit associated with the PD element is provided on a different lateral side of the PD element as the second CCD storage unit associated with the PD element.

5. The image acquisition system according to claim 3, wherein said one image frame is a second image frame and said another image frame is a first image frame, and the controller is configured to control that:
   the plurality of PD elements transfer the charge accumulated by the plurality of PD elements during the acquisition of the first image frame to the plurality of first CCD storage units, and
   the plurality of first CCD storage units transfer the charge accumulated during the acquisition of the first image frame and obtained from the plurality of PD elements to the plurality of second CCD storage units.

6. The image acquisition system according to claim 5, wherein the controller is further configured to control that, following the transfer from the plurality of the first CCD storage units to the plurality of second CCD storage units, the plurality of PD elements transfer the charge accumulated by the plurality of PD elements during the acquisition of the second image frame to the plurality of first CCD storage units.

7. The image acquisition system according to claim 4, wherein said one image frame is a first image frame and said another image frame is a second image frame, and the controller is configured to control that:
   the plurality of PD elements transfer the charge accumulated by the plurality of PD elements during the acquisition of the first image frame to the plurality of first CCD storage units, and
   the plurality of PD elements transfer the charge accumulated by the plurality of PD elements during the acquisition of the second image frame to the plurality of second CCD storage units.

8. The image acquisition system according to claim 4, wherein the plurality of first CCD storage units comprises a vertical CCD while the plurality of second CCD storage units comprises a horizontal CCD or vice versa.

9. The image acquisition system according to claim 1, wherein each of the plurality of first CCD storage units and the plurality of second CCD storage units comprises a vertical CCD or each of the plurality of first CCD storage units and the plurality of second CCD storage units comprises a horizontal CCD.

10. The image acquisition system according to claim 1, further comprising an illumination source configured to provide light detected by the plurality of PD elements.

11. The image acquisition system according to claim 10, wherein the light provided by the illumination source comprises pulsed light.

12. The image acquisition system according to claim 11, wherein the image acquisition system is a Time-Of-Flight system, further comprising one or more processors configured to determine distance to one or more objects based on the acquired image frames.

13. A non-transitory computer readable storage medium storing software code portions configured for, when executed on a processor, carrying out a method for controlling an interline charge-coupled device (CCD) sensor comprising a plurality of photodetecting (PD) elements, a plurality of first CCD storage units for storing a charge accumulated by the plurality of PD elements during an acquisition of one image frame, and a plurality of second CCD storage units for storing a charge accumulated by the plurality of PD elements during an acquisition of another image frame, the method comprising
   reading out at least a part of the charge accumulated during the acquisition of the one image frame comprising multiple exposures during the acquisition of the another image frame comprising multiple exposures,
   wherein the charge accumulated by the plurality of PD elements during the acquisition of the one image frame and of the another image frame is transferred from the plurality of PD elements by keeping a transfer gate for each of the plurality of PD elements open during the acquisition of the one image frame and of the another image frame and varying a substrate voltage to drain a portion of the charge accumulated by the plurality of PD elements in between the multiple exposures of each of the one image frame and the another image frame out of the plurality of PD elements.

14. The non-transitory computer readable storage medium according to claim 13, wherein said one image frame is a second image frame and said another image frame is a first image frame, and the method further comprises:
    transferring the charge accumulated by the plurality of PD elements during the acquisition of the first image frame to the plurality of first CCD storage units,
    transferring the charge accumulated during the acquisition of the first image frame from the plurality of first CCD units to the plurality of second CCD storage units, and
    following the transfer from the plurality of the first CCD storage units to the plurality of second CCD storage units, transferring the charge accumulated by the plurality of PD elements during the acquisition of the second image frame to the plurality of first CCD storage units.

15. The non-transitory computer readable storage medium according to claim 13, wherein said one image frame is a second image frame and said another image frame is a first image frame, and the method further comprises:
    transferring the charge accumulated by the plurality of PD elements during the acquisition of the first image frame to the plurality of first CCD storage units, and
    transferring the charge accumulated by the plurality of PD elements during the acquisition of the second image frame to the plurality of second CCD storage units.

16. The non-transitory computer readable storage medium according to claim 13, wherein the method further comprises performing Time-Of-Flight computations to determine distance to one or more objects based on the acquired image frames.

17. An interline charge-coupled device (CCD) image acquisition system comprising:
    a plurality of photodetecting (PD) elements,
    two sets of CCD storage units, each set of CCD storage units for storing a charge accumulated by the plurality of PD elements during an acquisition of a respective image frame comprising multiple exposures, and
    a controller for reading out at least a part of the charge stored in one set of CCD storage units during the acquisition of an image frame the charge for which is accumulated in another set of CCD storage units,
    wherein the charge accumulated by the plurality of PD elements during the acquisition of the respective image frame is transferred from the plurality of PD elements by keeping a transfer gate for each of the plurality of PD elements open during the acquisition of the respective image frame and varying a substrate voltage to drain a portion of the charge accumulated by the plurality of PD elements in between the multiple exposures of the respective image frame out of the plurality of PD elements.

18. The interline CCD image acquisition system according to claim 17, wherein each PD element of the plurality of PD elements is associated with one CCD storage unit of the plurality of first CCD storage units and with one CCD storage unit of the plurality of second CCD storage units.

* * * * *